3,270,048
PROCESS FOR THE PREPARATION OF TRIS (N-METHYLARYLAMINO)BORINES FROM ARYL ISOCYANATES, ISOTHIOCYANATES AND ISOCYANATE GENERATORS
Charles H. Mack and Samuel E. Ellzey, Jr., New Orleans, La., assignors to The United States of America as represented by the Secretary of Agriculture
No Drawing. Filed July 30, 1963, Ser. No. 298,793
9 Claims. (Cl. 260—551)

A non-exclusive, irrevocable, royalty-free license in the invention herein described, throughout the world for all the purposes of the United States Government, with the power to grant sublicenses for such purposes, is hereby granted to the Government of the United States of America.

This invention relates to a process for the preparation of tris(N-methyl-arylamino)borines from aryl isocyanates, isothiocyanates, or isocyanate generators.

Tris(N-methyl-arylamino)borines are compounds of the general formula

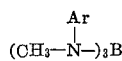

where Ar is a substituted or unsubstituted aryl radical.

Tris(N-alkyl-arylamino)borines have been prepared in a number of ways. Dornow and Gehrt (German Patent 1,044,822) obtained these products by reacting an N-alkyl-arylamine with boron trihalides in the presence of a Grignard reagent. Other methods include the reaction of an excess of an N-alkyl-arylamine with boron trichloride at low temperature and the reaction of an N-alkyl-arylamine with a low-boiling tris(alkylamino)borine (J. Chem. Soc., 1962, 4088).

All the previously reported methods for preparing tris(N-methyl-arylamino)borines require the use of the corresponding N-methyl-arylamine as a starting material. The process of the present invention may be advantageously used when the required N-methyl-arylamine is unavailable and only the corresponding primary arylamine is available. The latter is quite easily converted to the corresponding aryl isocyanate or isothiocyanate by well-known methods.

The process of the present invention comprises the steps of mixing an aryl isocyanate, isothiocyanate, or isocyanate generator with an alkali metal borohydride in an inert solvent at an elevated temperature for a time sufficient to bring about formation of the aminoborine, decomposing excess hydride with dilute acid, and isolating the product.

More specifically the process of this invention involves heating a mixture of at least one mole of an aryl isocyanate, isothiocyanate, or isocyanate generator with equivalent molar amounts of an alkali metal borohydride, such as sodium borohydride, in a high-boiling ether solvent, such as the dimethyl ethers of di- or triethylene glycol (diglyme or triglyme, respectively).

It is shown in our copending application (Serial No. 260,084, filed Feb. 20, 1963, now U.S. Patent 3,217,003) that equimolar amounts of sodium borohydride in ether solvents transform aryl isocyanates into triaryl isocyanurates at a temperature up to about 60° C. Likewise, it is shown in our copending application (Serial No. 256,198, filed Feb. 1, 1963, now U.S. Patent 3,180,891) that phenyl isothiocyanate is converted into thioformanilide by sodium borohydride from about 40°–90° C. Thus, in order to avoid the formation of such secondary products it is necessary that the process of the present invention be carried out at a temperature above about 90° C., preferably in the range of 150°–200° C. At higher temperatures reduction of the product borine tends to become an important competing reaction. Preferably the reaction is carried out at the boiling point of diglyme (161° C.).

Reaction times for the process of this invention may vary from a few minutes to several hours. Preferably the reaction is carried out for one to two hours, the longer times tending to produce a slightly lower yield of the borine.

Although the process of the present invention may be carried out using from one-third to two or more mole-equivalents of sodium borohydride per mole-equivalent of isocyanate, isothiocyanate, or isocyanate generator, the preferred ratio is about one mole-equivalent of hydride per mole-equivalent of isocyanate, isothiocyanate, or isocyanate generator.

In actual practice other products in addition to the aminoborine are produced by the process of this invention. Thus, for example, from phenyl isocyanate are produced from formanilide, aniline, and N-methylaniline. These products probably result from hydrolysis of various reaction intermediates representing different stages of reduction of the isocyanate. The secondary amine may be made the principal reaction product of the process of this invention by increasing the severity of the hydrolysis step prior to the isolation of products since it is found that strong acids easily hydrolyze tris(N-methyl-arylamino)borines to the corresponding secondary amines.

The practice of the process of this invention is not limited to the reaction of sodium borohydride with aryl isocyanates and isothiocyanates but may be extended to reactions involving the so-called isocyanate generators, that is, those compounds which through the action of heat and/or a catalyst are transformed into isocyanates. Thus, aryl isocyanate dimers and such materials as N-formyl-N,N'-diphenylurea yield an aryl isocyanate upon being heated to their decomposition temperatures and phenyl isocyanate trimer (triphenyl isocyanurate) under the action of heat and sodium borohydride yields the monomeric isocyanate. Other well-known isocyanate generators may also be employed.

The process of the present invention is apparently subject to a certain amount of steric control. Thus, α-naphthyl isocyanate gives none of the aminoborine but mainly N-α-naphthylformamide.

The tris(N-methyl-arylamino)borines formed by the process of the present invention are useful in the plastics industry as stabilizers and as additives for fuels.

The following examples are given by way of illustration but should not be construed as limiting the scope of the invention.

*Example 1*

To a slurry of 3.78 g. (0.1 mole) of sodium borohydride in 50 ml. of diglyme at reflux was added over 15 min. with stirring a solution of 11.92 g. (0.1 mole) of phenyl isocyanate in 30 ml. of diglyme. During the exothermic reaction, the mixture was protected by a calcium chloride tube. After a further one hour of refluxing, the yellow solution was cooled and poured into 750 ml. of ice and water. The mixture was left in a refrigerator overnight after decomposing the excess hydride with 100 ml. of 20% acetic acid. Tris(N-methyl-anilino)borine was filtered and washed well with water, 4.42 g. (40%), M.P. 206°–211° C. Sublimation at 185° C. (0.001 mm.) gave the pure product, M.P. 209°–213° C. and mixed M.P. with an authentic sample 212°–215° C. After filtration of the aminoborine, the acidic filtrate of the original reaction mixture was treated with concentrated hydrochloric acid and ether extracted. The water layer was made alkaline with sodium hydroxide and extracted with ether after saturating with salt. After washing the extract with salt solution and drying over sodium sulfate, the ether was evaporated and the residue analyzed by gas chromatography. In addition to traces of ether and a large amount of diglyme, the residue contained 0.45 g. (4.8%) of aniline and 2.76 g. (26%) of N-methylaniline. The presence of 0.40 g. (3.3%) of formanilide was also indicated.

*Example 2*

Experimental conditions were the same as in Example 1 except that 0.025 mole of phenyl isocyanate dimer and 0.05 mole of sodium borohydride were used. The yields of products were: tris(N-methylanilino)borine, 34%; N-methylaniline, 22%; and aniline, 6.8%. No formanilide was found.

*Example 3*

Experimental conditions were the same as in Example 1 except that 0.017 mole of triphenyl isocyanurate and 0.05 mole of sodium borohydride were used. The yields of products were: tris(N-methylanilino)borine, 28% N-methylaniline, 34%; aniline, 4.1%; and formanilide, 3.3%.

*Example 4*

Experimental conditions were the same as in Example 1 except that 0.024 mole of N-formyl-N,N'-diphenylurea and 0.048 mole of sodium borohydride were used. The yields of the products were: tris(N-methylanilino)borine, 32%; N-methylaniline, 31%; aniline, 10%; and formanilide, 1.7%.

*Example 5*

Experimental conditions were the same as in Example 1 except that 0.05 mole of phenyl isothiocyanate and 0.05 mole of sodium borohydride were used. Tris(N-methylanilino)borine was formed in a yield of 1.8% and the N-methylaniline amounted to 91%. No aniline was found.

*Example 6*

Experimental conditions were the same as in Example 1 except that 0.1 mole of p-tolyl isocyanate and 0.1 mole of sodium borohydride were used. The yield of the crude tris(N-methyl-p-toluidino)borine, M.P. 145°–155° C., was 5.40 g. (43.6%). Recrystallization from acetone gave the pure product, M.P. 170.5°–172° C.

*Analysis.*—Calcd. for $C_{24}H_{30}BN_3$: C, 77.63; H, 8.14; N, 11.32. Found: C, 78.02; H, 8.13; N, 11.62.

Other products were: N-methyl-p-toluidine, 16% and p-toluidine, 11%.

*Example 7*

Experimental conditions were the same as in Example 1 except that 0.05 mole of p-methoxyphenyl isocyanate and 0.05 mole of sodium borohydride were used. The crude yield of tris(N-methyl-p-anisidino)borine was 37.8%. Recrystallization frome acetone and hexane gave the pure product, M.P. 152°–153° C.

*Analysis.*—Calcd. for $C_{24}H_{30}BN_3O_3$: C, 68.74; H, 721; N, 10.02. Found: C, 68.72; H, 7.54; N, 9.85.

The yield of N-methyl-p-anisidine was 6% and the p-anisidine amounted to 10%.

We claim:
1. A process for preparing tris(N-methyl-arylamino)borines which comprises reacting sodium borohydride with a reagent from the group consisting of an aryl isocyanate, an aryl isocyanate dimer, a triaryl isocyanurate, and N-formyl-N,N'-diarylurea, and an aryl isothiocyanate, wherein the aryl moiety of said reagent is a member of the group consisting of phenyl, tolyl, and anisyl, under anhydrous conditions and at a temperature of about from 150° to 200° C.

2. A process for preparing tris(N-methyl-anilino)borine which comprises reacting equimolar amounts of sodium borohydride with a reagent of the group consisting of phenyl isocyanate, phenyl isocyanate dimer, triphenyl isocyanurate, N-formyl-N,N'-diphenylurea, and phenyl isothiocyanate under anhydrous conditions, at a temperature of about from 150° to 200° C., and in diglyme as a solvent.

3. The process of claim 2 wherein the reagent is phenyl isocyanate.

4. The process of claim 2 wherein the reagent is phenyl isocyanate dimer.

5. The process of claim 2 wherein the reagent is triphenyl isocyanurate.

6. The process of claim 2 wherein the reagent is N-formyl-N,N'-diphenylurea.

7. The process of claim 2 wherein the reagent is phenyl isothiocyanate.

8. A process for preparing tris(N-methyl-p-toluidino)borine which comprises reacting equimolar amounts of sodium borohydride and p-tolyl isocyanate under anhydrous conditions, at a temperature of about from 150° to 200° C., and in diglyme as a solvent.

9. A proecss for preparing tris(N-methyl-p-anisidino)borine which comprises reacting equimolar amounts of sodium borohydride and p-methoxyphenyl isocyanate under anhydrous conditions, at a temperature of about from 150° to 200° C., and in diglyme as a solvent.

References Cited by the Examiner

UNITED STATES PATENTS 3,180,891   2/1963   Ellzey et al. _____ 260—567

OTHER REFERENCES

The Merck Index, 7th ed., page 39, Merck and Co., Rahway, N.J. (1960).

WALTER A. MODANCE, *Primary Examiner.*

HARRY I. MOATZ, *Assistant Examiner.*